US010062353B2

(12) United States Patent
Yeung et al.

(10) Patent No.: US 10,062,353 B2
(45) Date of Patent: Aug. 28, 2018

(54) SYSTEM TO COMPENSATE FOR VISUAL IMPAIRMENT

(71) Applicant: Intel Corporation, Santa Clara, CA (US)

(72) Inventors: Fai Yeung, San Jose, CA (US); John Wei, Saratoga, CA (US); Murat Yener, Istanbul (TR)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 15/193,428

(22) Filed: Jun. 27, 2016

(65) Prior Publication Data

US 2017/0372673 A1    Dec. 28, 2017

(51) Int. Cl.
 *G06T 5/00*    (2006.01)
 *G09G 5/00*    (2006.01)

(52) U.S. Cl.
 CPC ............. *G09G 5/005* (2013.01); *G06T 5/006* (2013.01); *G09G 2320/0261* (2013.01); *G09G 2340/14* (2013.01)

(58) Field of Classification Search
 CPC ........... G09G 5/005; G09G 2320/0261; G09G 2340/14; G06T 5/006; G06T 2207/20004; G06T 2207/20008; G06T 2207/20012; G06T 19/006; G02B 27/0172; G02B 2027/0178; G02B 2027/0138; G02B 2027/014; G02B 27/0093; G02B 27/17; G02B 27/017; G06F 3/013; G06F 3/012; B60R 2300/103; B60R 2300/105; B60R 2300/106; B60R 2300/301; B60R 2300/305; B60R 2300/308; B60R 2300/70; B60R 2300/802; B60R 2300/8026; B60R 2300/8046; B60R 2300/8053; B60R 2300/8066
 See application file for complete search history.

(56) References Cited

U.S. PATENT DOCUMENTS

| 8,374,454 B2 | 2/2013 | Wang |
| 8,482,859 B2 | 7/2013 | Border et al. |
| 2010/0265048 A1* | 10/2010 | Lu ............................ B60Q 9/005 340/435 |
| 2011/0181728 A1* | 7/2011 | Tieman ..................... B60R 1/00 348/148 |
| 2011/0261176 A1 | 10/2011 | Monaghan, Sr. et al. |

(Continued)

*Primary Examiner* — Diane Wills
(74) *Attorney, Agent, or Firm* — Grossman, Tucker, Perreault & Pfleger, PLLC

(57) ABSTRACT

This disclosure is directed to a system to compensate for visual impairment. The system may comprise, for example, a frame wearable by a user to which is mounted at least sensing circuitry and display circuitry. The sensing circuitry may sense at least visible data and depth data. Control circuitry may then cause the display circuitry to visibly present the depth to the user based on the visible data and depth data. For example, the display circuitry may present visible indicia indicating depth to appear superimposed on the field of view to indicate different depths in the field of view, or may alter the appearance of objects in the field of view based on the depth of each object. The system may also be capable of sensing a particular trigger event, and in response may initiate sensing and presentation for a peripheral field of view of the user.

24 Claims, 4 Drawing Sheets

(56) References Cited

U.S. PATENT DOCUMENTS

| | | | |
|---|---|---|---|
| 2012/0212399 A1* | 8/2012 | Border | G02B 27/017 345/8 |
| 2012/0249741 A1* | 10/2012 | Maciocci | G06F 3/011 348/46 |
| 2013/0214998 A1 | 8/2013 | Andes et al. | |
| 2015/0002808 A1* | 1/2015 | Rizzo, III | A61F 9/08 351/158 |
| 2015/0260474 A1 | 9/2015 | Rublowsky et al. | |
| 2017/0068119 A1* | 3/2017 | Antaki | H04N 5/2251 |

* cited by examiner

SYSTEM TO COMPENSATE FOR VISUAL IMPAIRMENT

TECHNICAL FIELD

The present disclosure relates to vision enhancement, and more particularly, to a system that compensates for visual impairment by generating depth-enhanced and/or peripheral images.

BACKGROUND

While faster computing devices and more powerful smartphones are always appreciated, technological development is not limited to producing electronics that are smaller, faster and/or more functional. Technology may also be employed to improve the quality of life for those that may be suffering with physical infirmities. For example, developments in prosthesis design may improve the situation of people that are missing limbs, new drugs and improvements in existing remedies may provide more promising outcomes for patients suffering with serious conditions, new surgical tools and/or procedures may help to improve, or even save, the lives of patients, etc. At least one area where substantial benefit may be realized from technical advancement is vision correction. Glasses, contacts and laser surgery are examples of the most readily known varieties of vision correction, but these corrective measures may only address very basic vision problems.

For example, depth-related issues in a person's vision are very difficult to accommodate. A person with only one eye would not be able to perceive depth. In monocular vision both eyes are functional but used separately. For example, a patient having a monocular vision impairment may have adequate vision in one eye with very limited to no vision in the other. As a result, the patient may be unable to discern depth. A patient experiencing monopsia has medically normal eyes but still cannot perceive vision three-dimensionally. Even though a patient having no depth perception may employ different visual cues to perceive depth information, the effectiveness of depth cues may be limited to only a few scenarios such as motion parallax, depth from motion, perspective viewing, and relative size of objects. Moreover, losing the full use of both eyes may be accompanied by the loss of peripheral vision on at least one side of the body. These changes in vision may affect how the brain perceives its surroundings. For example, the loss of binocular vision may negatively impact balance and postural control to an extent that injuries may occur as a result of losing balancing or incorrect posture may become permanent, especially in children.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
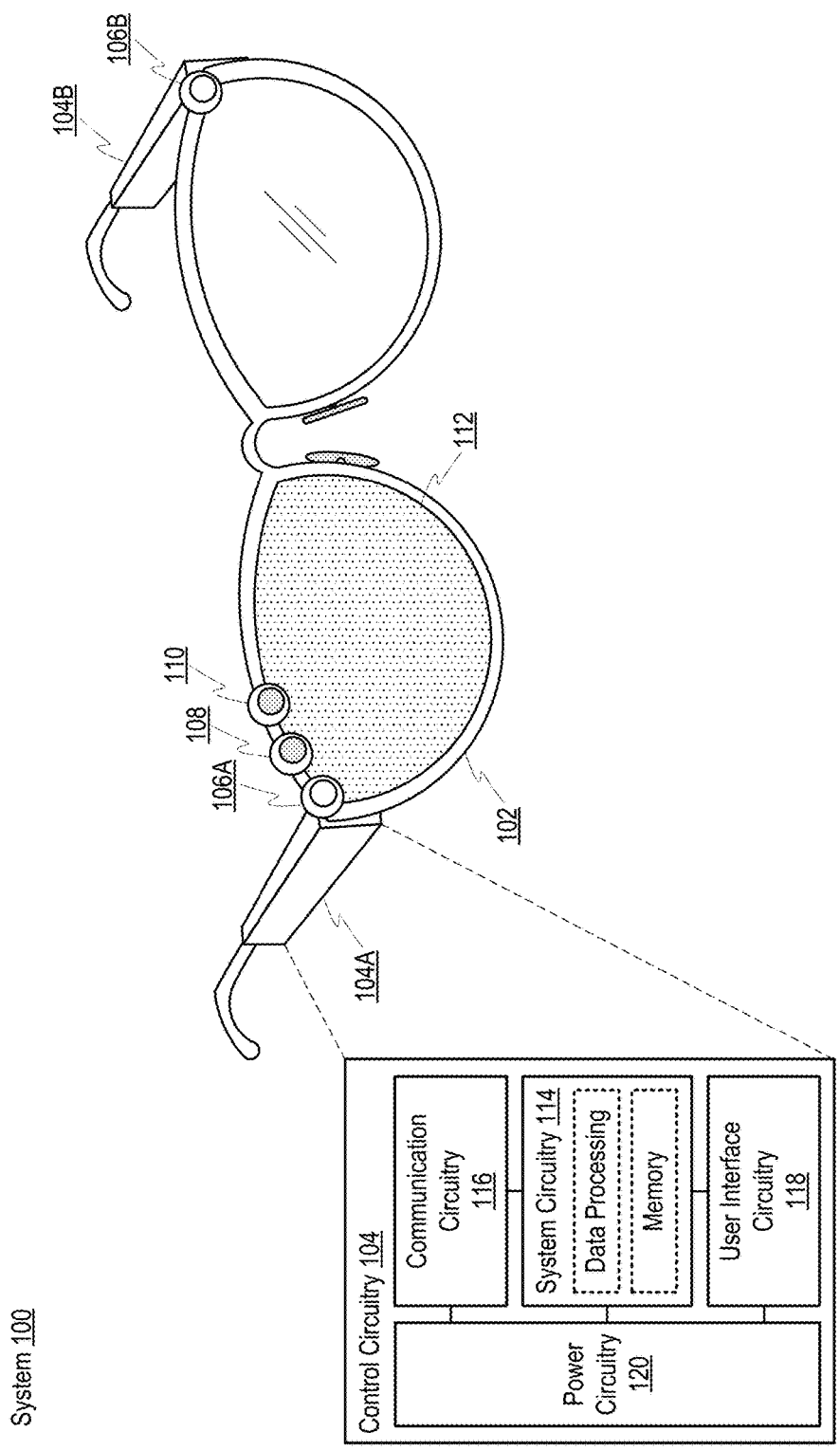
FIG. 1 illustrates an example system to compensate for visual impairment in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a system to compensate for visual impairment. In general, the system may compensate for a user's natural inability to perceive depth by presenting a visible representation of depth in the field of view of the user. The system may comprise, for example, a frame wearable by a user to which is mounted at least sensing circuitry and display circuitry. The sensing circuitry may sense at least visible data and depth data. Control circuitry may then cause the display circuitry to visibly present the depth to the user based on the visible data and depth data. The display circuitry may comprise, for example, at least one transparent or semi-transparent lens on which the depth may be visibly presented. In an example implementation, the control circuitry may cause the display circuitry to present visible indicia indicating depth. The visible indicia may appear superimposed on the field of view to visibly indicate different depths to the user. The control circuitry may also cause the display circuitry to visibly indicate depth by altering the appearance of objects in the field of view based on the depth of each object. In at least one embodiment, the system may also be capable of sensing position, orientation, movement, acceleration, etc. In response to sensing a trigger event (e.g., related to movement of the user's head), the control circuitry may cause the sensing circuitry to start sensing a peripheral field of view of the user and the display circuitry to present the sensed peripheral field of view.

In at least one embodiment, an example system to compensate for visual impairment may comprise at least a frame, sensing circuitry, display circuitry and control circuitry. The frame may be wearable by a user. The sensing circuitry may be coupled to the frame, wherein the sensing circuitry may be to at least sense visible data and depth data in a field of view of the user. The display circuitry may be coupled to the frame. The control circuitry may be to cause the display circuitry to present a visible representation of depth in the field of view based on the visible data and the depth data.

In at least one embodiment, the sensing circuitry may comprise at least one camera to sense the visible data and at least one infrared emitter and detector pair to sense the depth data. The depth of objects sensed in the field of view may be determined utilizing a time-of-flight calculation based on detected reflection of emitted IR signals. The display circuitry may comprise at least one transparent or semi-transparent lens mounted in the frame, the visible representation of depth in the field of view being presented on the at least one lens to visibly convey depth to the user.

In at least one embodiment, the visible representation of depth may comprise visible indicia of depth presented by the display circuitry so as to appear superimposed on the field of view. In the same or a different embodiment, the visible representation of depth may comprise modifications to the appearance of objects in the field of view to visibly represent depth. In presenting a visible representation of depth, the control circuitry may be to cause the display circuitry to present the visible data modified to include the visible representation of depth superimposed on the visible data. The control circuitry may be to cause the display circuitry to present the visible representation of depth only for depths greater than a certain distance from the user.

In at least one embodiment, the system may further comprise user interface circuitry to sense a trigger event based on at least one of a position, orientation, velocity or acceleration. The control circuitry may be to cause the sensing circuitry to initiate sensing for a peripheral field of view based on sensing the header trigger motion and cause the display circuitry to present a peripheral field of view to the user based on sensing the trigger event. Consistent with the present disclosure, an example method for providing compensation for visual impairment may comprise capturing visual data within a field of view of a user utilizing sensing circuitry coupled to a frame wearable by the user, capturing depth data utilizing the sensing circuitry and presenting a visible representation of depth in the field of view based on the visible data and the depth data utilizing display circuitry coupled to the frame.

FIG. 1 illustrates an example system to compensate for visual impairment in accordance with at least one embodiment of the present disclosure. Particular implementations such as in an eyeglass configuration and/or particular technologies that may be usable for visible data sensing, depth data sensing, displaying images with respect to a field of view, etc. are referenced herein. These implementations and/or technologies are merely examples presented to provide a readily comprehensible perspective from which the more generalized devices, systems, methods, etc. discussed herein may be understood. Other applications, configurations, technologies, etc. may result in implementations that remain consistent with the teachings presented herein. Moreover, an apostrophe following an item number (e.g., 100') indicates that an example embodiment of the item is being illustrated. These examples are provided merely for the sake of explanation. As referenced herein, a "field of view" of the user may be defined by the direction in which the user is looking (e.g., the center of gaze) over a range allowed by the user's vision. For example, a user with vision issues may have a narrower field of view than other people. The "peripheral field of view" may then include the area existing immediately outside of the field of view. When the user turns his/her head, objects existing in the peripheral field of view in the direction toward which the user's head turns may move into the field of view. As an example, the field of view of a user driving an automobile is the direction in which the user is looking (e.g., typically straight ahead through the windshield of the automobile). When changing lanes, a head turn by the user allows the peripheral field of view to be assessed for other automobiles in the destination lane.

System 100 may comprise frame 102 on which circuitry may be "mounted." Mounting may include at least sensing circuitry (e.g., including at least individual sensors 106A, 106B, 108 and 110) and display circuitry 112 being incorporated within the structure of frame 102, attached to frame 102 via mechanical attachment (e.g., via screw, nail, clip or other mechanical fastener), adhesive attachment (e.g., via tape, glue, epoxy, etc.), etc. Control circuitry 104 (e.g., including control circuitry 104A and/or control circuitry 104B) may optionally be mounted to frame 102 using a fixed or removable attachment. Frame 102 is illustrated as an eyeglass frame only for the sake of explanation. Eyeglasses provide an appropriate foundation on which to implement the various features consistent with the present disclosure. Moreover, since eyeglasses, sunglasses, safety glasses, etc. are already routinely worn by people, it may also mean that there is minimal opposition to adoption of the technology. Notwithstanding the foregoing advantages offered by eyeglasses of the types discussed above, the various teachings disclosed herein may alternatively be embodied in different form factors including, for example, any structure that may be capable of acting as a platform for the variety of systems, devices, components, etc. described herein.

Sensing circuitry may comprise at least visible data capture sensors 106A and 106B along with depth sensing circuitry 108 and 110. For example, visible data capture sensors 106A and 106B may include cameras capable of capturing images, video, etc. Depth sensing circuitry 108 and 110 may comprise various technologies capable of sensing depth. For the sake of example, depth sensing circuitry 108 and 110 may comprise an infrared emitter and infrared (IR) detector pair that may be configured to emit IR energy beams and detect reflection of the energy beams. Other examples of technologies that may be usable for sensing depth may include, but are not limited to, stereoscopic depth sensing based on multiple visible inputs, fixed structure light sensing, programmable structure light sensing, etc. Sensors 106A and 106B may capture visible data while depth sensing circuitry 108 and 110 may capture depth data. While sensors 106A, 106B, 108 and 110 are depicted as mounted in certain locations and with certain orientations with respect to frame 102, embodiments consistent with the present disclosure are not limited to the implementation shown. Moreover, not all sensors 106A, 106B, 108 and 110 may be active at the same time.

In capturing depth data, sensors 108, 110 and/or control circuitry 104 may be configured based on Time-of-flight (TOF) wherein the depth of objects is determined by calculating a phase shift between an IR laser pulse received by IR detector 110 and an IR laser pulse emitted by IR emitter 108. The captured depth data may then be processed by control circuitry 104 to generate a depth map of the field of view. The resolution of the depth map may depend on the resolution of the IR emitter/receiver array, but in general is much lower than the resolution of visible data (e.g., color image) captured by visible data sensors 106A and/or 106B (e.g., RGB cameras). In at least one embodiment, the correspondence of a received pulse in a TOF range camera 110 to the pixel location in RGB camera 106A mounted on the side of normal eye may be established during factory calibration of system 100. Since the depth map may be distributed sparsely, the depth value for each pixel in color image may be interpolated from the pixel's neighboring depth values in depth map. With this approach, a detailed image including depth may be established.

Display circuitry 112 may comprise a transparent or semi-transparent lens configured to present at least visible representations of depth to a user. In at least one example implementation, the lens may be an eyeglass lens onto which the visible representations of depth are projected by a video projector in display circuitry 112. For example, the lens may comprise a coating that is substantially transparent but may act as a surface onto which the visible representations of depth may be projected. In another example implementation, the lens in total may be a transparent or semi-transparent electronic display usable to present the visible representations of depth to the user, or may at least include an embedded transparent or semi-transparent electronic display in the field of view of the user. Display circuitry 112 may then be configured to receive data from control circuitry 104 and drive the lens display to present the visible representations of depth.

Control circuitry 104 may be configured to perform activities in system 100 comprising, for example, controlling the sensing circuitry including at least sensors 106A, 106B, 108 and 110, receiving visual and depth data from the sensing circuitry, generating visible representations of depth based on the visual and depth data, controlling display circuitry 112 to present the visible representations of depth, controlling the sensing circuitry and display circuitry 112 to sense and present a peripheral field of view, etc. Control circuitry 104 may be implemented in a variety of different configurations. In example system 100 control circuitry 104 is distributed into sections 104A and 104B that are each mounted on earpieces of frame 102. In other embodiments, control circuitry 104 may be consolidated (e.g., only section 104A may be employed) or may be situated completely separate from frame 102. When separate from frame 102 control circuitry 104 may be a standalone device or may be replaced by another device able to provide similar functionality (e.g., a mobile computing device such as a smart phone), wherein control circuitry 104 may then interact with the sensing circuitry and/or display circuitry 112 via wireless communication.

Control circuitry 104 may comprise, for example, system circuitry 114, communication circuitry 116, user interface 118 and power circuitry 120. System circuitry 114 may comprise at least data processing and memory resources. Example data processing resources may include one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various x86-based microprocessors available from the Intel Corporation including those in the Pentium®, Xeon®, Itanium®, Celeron®, Atom®, Quark®, Core i-series, product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which the data processing resources may interact with other system components that may be operating at different speeds, on different buses, etc. in control circuitry 104. Some or all of the functionality commonly associated with the support circuitry may also be included in the same physical package as the processor (e.g., such as in the Sandy Bridge family of processors available from the Intel Corporation).

The data processing resources may be configured to execute various instructions in control circuitry 104. Instructions may include program code configured to cause the data processing resources to perform activities related to reading data, writing data, processing data, formulating data, converting data, transforming data, etc. Information (e.g., instructions, data, etc.) may be stored in the memory resources. The memory resources may comprise random access memory (RAM) or read-only memory (ROM) in a fixed or removable format. RAM may include volatile memory configured to hold information during the operation of control circuitry 104 such as, for example, static RAM (SRAM) or Dynamic RAM (DRAM). ROM may include non-volatile (NV) memory circuitry configured based on BIOS, UEFI, etc. to provide instructions when control circuitry 104 is activated, programmable memories such as electronic programmable ROMs (EPROMS), Flash, etc. Other fixed/removable memory may include, but are not limited to, example magnetic memories such as hard disk (HD) drives, etc., example electronic memories such as solid state flash memory (e.g., embedded multimedia card (eMMC), etc.), removable memory cards or sticks (e.g., micro storage device (uSD), USB, etc.), example optical memories such as compact disc-based ROM (CD-ROM), Digital Video Disks (DVD), Blu-Ray Disks, etc.

Communication circuitry 116 may manage communications-related operations for control circuitry 104, which may include resources configured to support wired and/or wireless communications. Control circuitry 104 may comprise multiple sets of communication circuitry 116 (e.g., including separate physical interface circuitry for wired protocols and/or wireless radios). Wired communications may include serial and parallel wired mediums such as, for example, Ethernet, Universal Serial Bus (USB), Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communications, satellite-based communications, etc.), electronic communications via sound waves, etc. In one embodiment, communication circuitry 116 may be configured to prevent wireless communications from interfering with each other. In performing this function, communication circuitry 116 may schedule communication activities based on, for example, the relative priority of messages awaiting transmission.

User interface circuitry 118 may comprise hardware and/or software to allow users to interact with control circuitry 104 such as, for example, various input mechanisms including microphones, switches, buttons, knobs, keyboards, speakers, touch-sensitive surfaces, one or more sensors configured to capture images and/or sense proximity, distance, motion (e.g., including linear and angular velocity and acceleration), gestures, orientation, biometric data, etc. Examples of various output mechanisms may include speakers, displays, lighted/flashing indicators, electromechanical components for vibration, motion, etc. The hardware in user interface circuitry 118 may be incorporated within control circuitry 104 and/or may be coupled to control circuitry 104 via a wired or wireless communication medium. Power circuitry 120 may include internal power sources (e.g., battery, fuel cell, etc.) and/or connections for external power sources (e.g., power grid, electromechanical or solar generator, external fuel cell, etc.) and related circuitry configured to supply control circuitry 104 with the power needed to operate.

In an example of operation, a user may wear frame 102 as one would wear a normal pair of eyeglasses. Given that the user lacks binocular vision due to having limited or no sight in one eye, display circuitry may be arranged within the field of view of the functional eye, while the substantially non-functional eye may be covered by a standard prescription or non-prescription lens. Upon activation of system 100, control circuitry 104 may cause the sensing circuitry (e.g., including at least sensors 106A, 106B, 108 and 110) to initiate sensing operations. Consistent with the present disclosure, the sensing circuitry may be focused so as to generate visible data and depth data from the field of view of the user. Control circuitry 104 may then process the visible data and depth data to generate visible representations of depth, which may be presented to the user by display circuitry 112. In at least one embodiment, a trigger event sensed by user interface circuitry 118 (e.g., a user's head turning at a particular velocity or acceleration) may indicate that the user is attempting to view a peripheral field of view. Control circuitry 104 may then, for example, cause the sensing circuitry to reconfigure for sensing the peripheral field of view. Upon receiving visible data captured from the peripheral field of view, control circuitry may then cause display circuitry 112 to present the visible data. More detailed examples of sensing data, processing data and presenting data will be discussed in regard to FIGS. 2 to 4.

Figure 2:
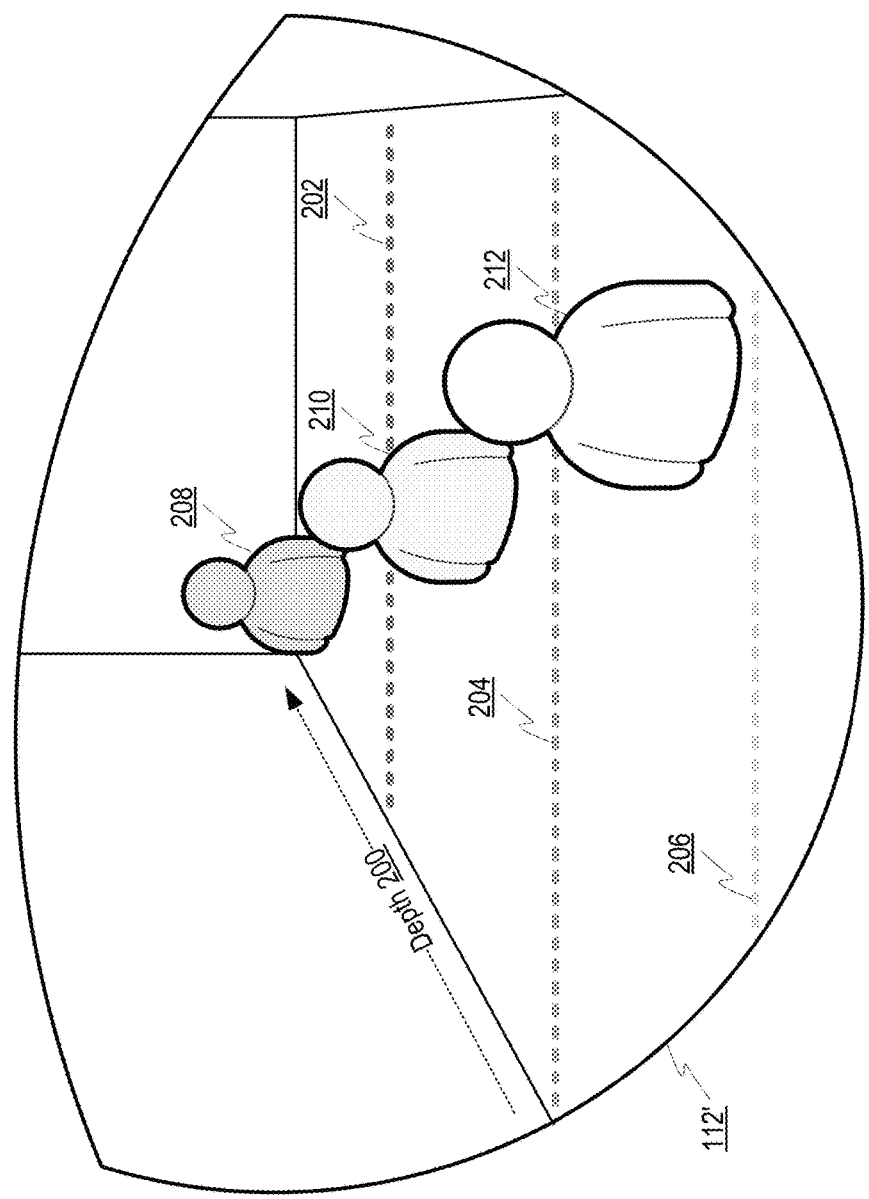
FIG. 2 illustrates an example visible presentation of depth data in accordance with at least one embodiment of the present disclosure.

FIG. 2 illustrates an example visible presentation of depth data in accordance with at least one embodiment of the present disclosure. In the example implementation illustrated in FIG. 2, display circuitry 112' may cover the entire lens area of frame 102. The visible representations of depth that may be presented by display circuitry 112' may be generated to appear superimposed on the field of view of the user, or may comprise visual data captured and modified to replace the actual field of view of the user. In an instance where the visible representations of depth appear to be superimposed, display circuitry 112 may present visible indicia on the transparent or semi-transparent lens so as to appear to exist in the field of view. The visible indicia may be semi-transparent so as to not obstruct the view of the user. Alternatively, visible data (e.g., video) may be continuously captured by the sensing circuitry (e.g., sensor 106A) and then altered by control circuitry 104 to include the visible representations of depth. The modified video feed may then be presented to the user by display circuitry 112'. An existing manner of presentation that may be considered analogous is the insertion of markers electronically superimposed over the field of play in a video presentation of a sporting event, such as first down lines that are electronically superimposed over the field in a football game. Consistent with the present disclosure, control circuitry 104 may further cause display circuitry 112' to discontinue the presentation of visible representations of depth to in certain situations. For example, for depth ranges within a certain distance (e.g., three feet), control circuitry 104 may not present visible representations of depth. For example, a user that is eating, reading a book, working on a computer, etc. would not need the visible representations of depth, and may be annoyed by their presence at such close-range.

In FIG. 2 an example scene is shown looking through the lens of display circuitry 112', wherein the depth in the field of view is shown at 200. Consistent with the present disclosure, a first example of visible representations of depth is illustrated by line 202, line 204 and line 206 (collectively, "lines 202 to 206"). Lines 202 to 206 may be superimposed on the field of view to demonstrate different depths (e.g., four feet, eight feet, twelve feet, etc.). The lines may have different patterns or colors to signify the depth. In this manner, a user may be able to determine an approximate depth of an object by the object's proximity to a line.

In another embodiment, control circuitry 104 may alter the appearance of objects based on their sensed depth. For example, control circuitry 104 may alter the color hue of objects to signify their depth. Altering the color hue may not substantially alter how the objects appear, but may impart a slightly modified color aspect that may be identifiable by the user and attributable to a depth. Objects with a modified color hue based on their distance from the user are shown at 208 and 210. Distant object 208 is modified to have a dark hue, closer in object 210 is modified to have a lighter hue and close-proximity object 212 has no depth-based color hue modification. In an example embodiment wherein the color hue of objects may be modified based on depth, a color space for each pixel of visible data captured from the field of view may be represented by (L, u, v), wherein L is the luminance and u, v is the chrominance of the pixel. The sensed depth of the pixel then be represented by altering the hue h of the pixel in terms of chrominance based on h=a tan 2(v, u). Transparency for the lens in display circuitry 112' may be adjusted utilizing an alpha channel that may have values ranging from 0 to 255. Opacity for the altered h may be a configurable value, and has been selected to be 75 in the following example to represent sensed depth. Thus, the perceived brightness and color at the location of a pixel may be represented by:

$$p(L, u, v) = \frac{75}{255} p_d(255, u_d, v_d) + \frac{180}{255} p_v(L_v, u_v, v_v) \quad (1)$$

$$\text{for } h_d = \text{atan2}(u_d, v_d) \text{ and } h_d \geq 3 \text{ ft} \quad (2)$$

Wherein d values correspond to the sensed depth and v values correspond to the captured field of view. The above mathematical expression is equivalent to overlaying a semi-transparent color canvas $p_d(255, u_d, v_d)$ onto the incoming field of view $p_v(L_v, u_v, v_v)$. The depth data is represented by the color of canvas determined by, $h_d$=a tan 2($u_d$, $v_d$)). To maintain the clarity of view for visual objects close to the user, we only blend those visual objects beyond of three feet with distance information in the view, or $h_d \geq 3$ ft.

Figure 3:
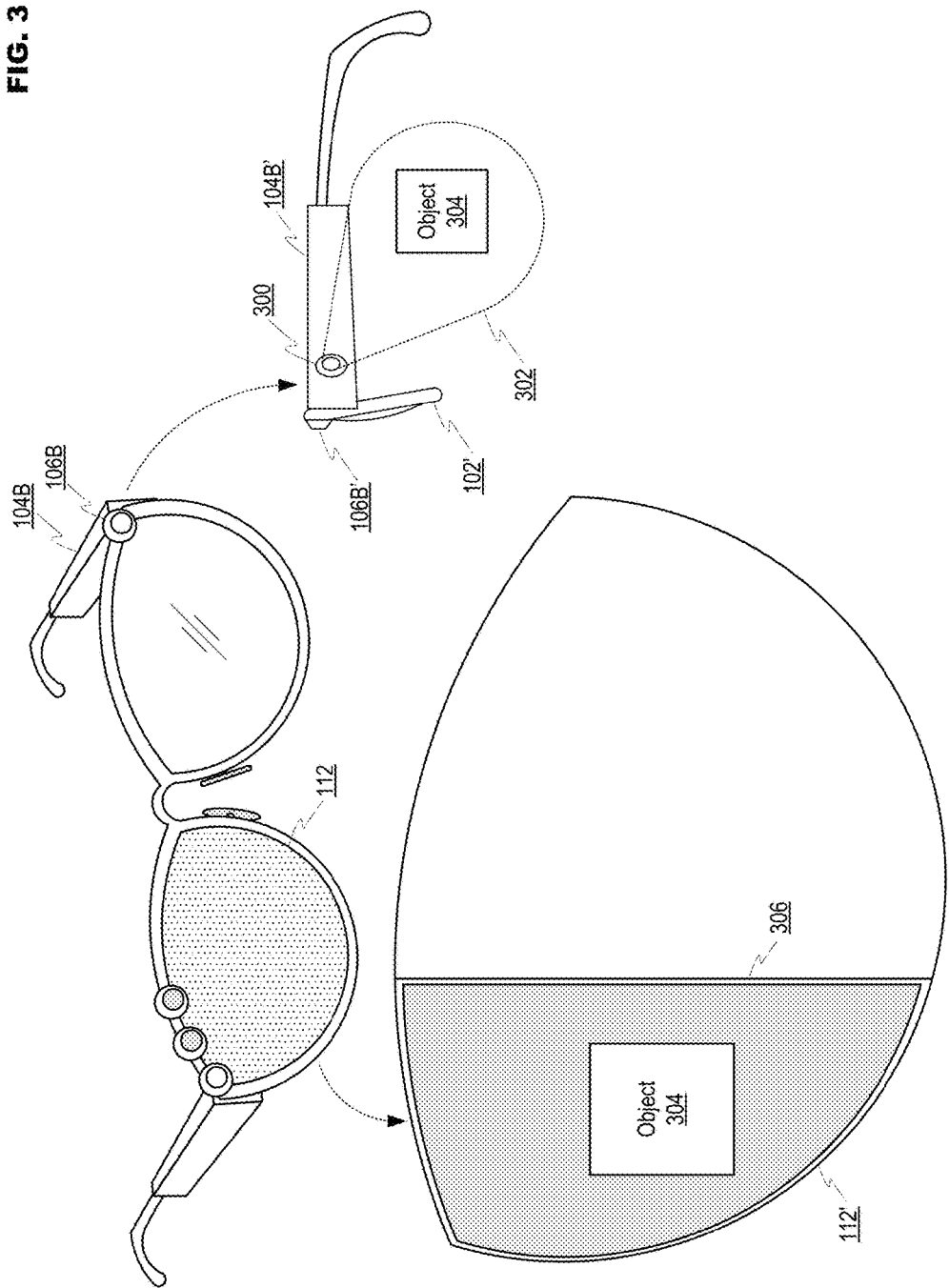
FIG. 3 illustrates an example configuration and visible presentation of peripheral data in accordance with at least one embodiment of the present disclosure.

FIG. 3 illustrates an example configuration and visible presentation of peripheral data in accordance with at least one embodiment of the present disclosure. FIG. 2 demonstrates a mode of operation wherein system 100 may present a peripheral field of view. For example, a driver may need to check their peripheral field of view when changing lanes. This may be difficult for a person who has lost some or all of their vision in one eye. System 100 may sense when a user is attempting to look at their peripheral field of view, may reconfigure the sensing circuitry if necessary, and may present the peripheral field of view to the user using display circuitry 112'.

In at least one embodiment, user interface circuitry 118 may comprise sensors capable of detecting a trigger event. An example trigger event may be a head turn by the user, which may be detected by at least one of position, orientation, motion, velocity or acceleration sensors in user interface circuitry 118. The sensors may be used alone or in combination to discern normal head turns from those used to view the peripheral field of view. Using the driver analog again, a driver checking the next lane for traffic may make a rapid head turn. Thus, the velocity and/or acceleration of the head turn may be a determining factor as to whether to present the peripheral field of view.

FIG. 3 shows a side view of system 100 to demonstrate a variety of ways in which visible data may be captured from the peripheral field of view. In one example implementation, sensor 106B may have a wide viewing angle that allows visible data to be captured from the peripheral field of view without requiring reconfiguration of the sensing circuitry. The head turn of the user may put sensor 106B in the correct position to sense the peripheral field of view. Alternatively, sensor 106B may be reconfigured upon detecting the trigger event. For example, sensor 106B may be moved (e.g., via an electronic actuator) to a position directed towards the peripheral field of view upon detecting the trigger event. In another possible configuration, the sensing circuitry may comprise another visible data sensor 300 aimed to capture the peripheral field of view. As shown at 302, sensor 300 may sense objects in the peripheral field of view such as object 304.

After capturing visible data from the peripheral field of view, control circuitry 104 may cause display circuitry 112' to present the visible data (e.g., display an image of the peripheral field of view). For example, control circuitry 104 may cause display circuitry 112' to "pop up" screen 306 (e.g., digitally superimposed on the lens), wherein screen 306 shows the peripheral field of view including object 304, and may continue to update the contents of screen 306. In at least one embodiment, screen 306 may continue to be displayed with an updating video feed of the peripheral field of view until a second trigger event is sensed. For example, when user interface circuitry 118 senses a head turn in a direction away from the peripheral field of view, control circuitry 104 may then cause display circuitry 112' to remove screen 306 from the lens.

Figure 4:
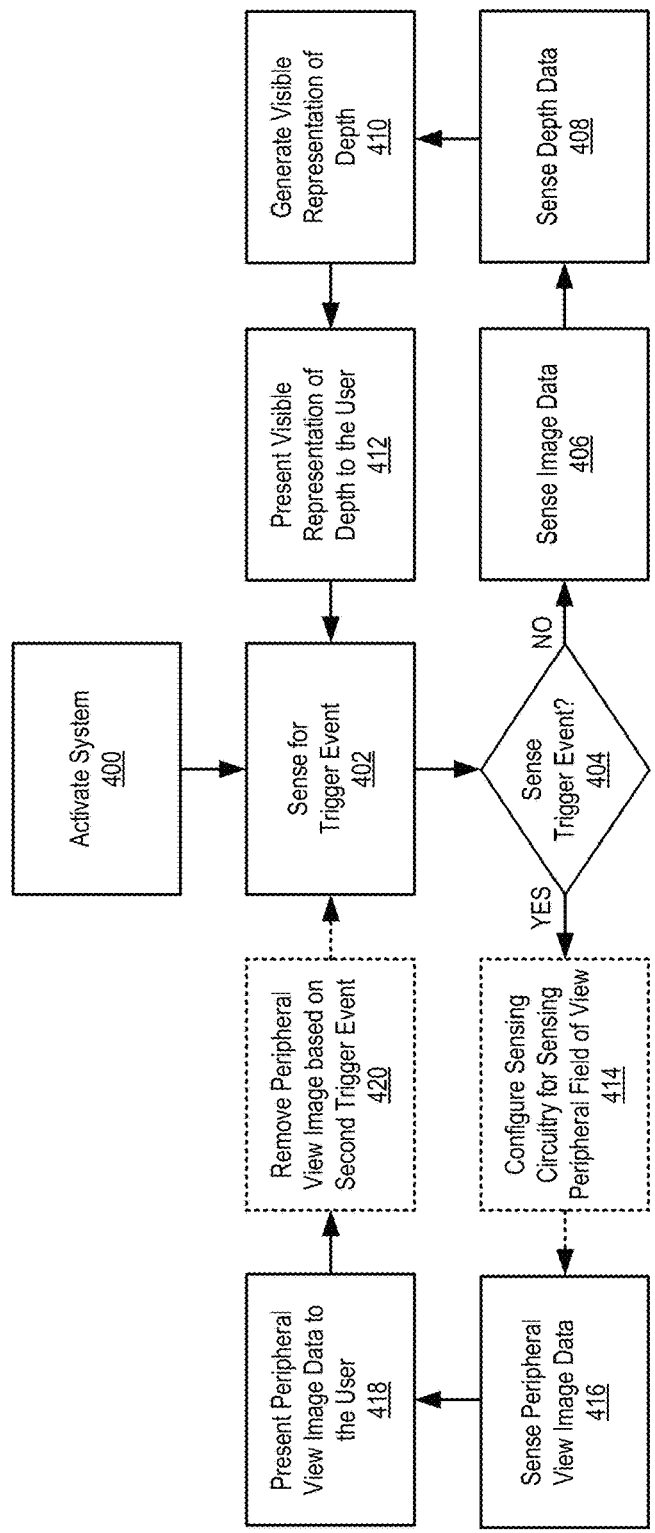
FIG. 4 illustrates example operations for providing compensation for visual impairment in accordance with at least one embodiment of the present disclosure.

FIG. 4 illustrates example operations for providing compensation for visual impairment in accordance with at least one embodiment of the present disclosure. In operation 400 a system may be activated. The system may then initiate sensing for a trigger event in operation 402. If in operation 404 it is determined that a trigger event has not been sensed, then in operation 406 image data for the field of view of a user of the system may be sensed by sensing circuitry in the system, and depth data for the field of view may be sensed by the sensing circuitry in operation 408. Control circuitry in the system may then general a visible representation of depth for the field of view in operation 410. The visible representation of depth for the field of view may be presented to the user by display circuitry in operation 412, which may be followed by operation 402 wherein sensing for the trigger event may continue.

A determination in operation 404 that the trigger event has occurred may be followed by optional operation 414 wherein the sensing circuitry may be configured for sensing a peripheral field of view. Operation 414 may be optional in that in some implementations no configuration may be required for the sensing circuitry to commence sensing the peripheral field of view. In operation 416 the sensing circuitry may sense the peripheral field of view to capture peripheral view image data, and the peripheral view image data may be presented to the user in operation 418. For example, the peripheral view image data may be presented by a screen superimposed on a lens in the display circuitry. Optionally, in operation 420 the presentation of the peripheral view image data may continue until a second trigger event is sensed (e.g., a head turn by the user in a direction away from the peripheral view). Alternatively, the presentation of the peripheral view image data may be removed after a certain duration of time, user interaction instructing the control circuitry to discontinue presentation of the peripheral view image data, etc. Operation 420 may be followed by a return to operation 402 to continue sensing for the trigger event.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, this disclosure is directed to a system to compensate for visual impairment. The system may comprise, for example, a frame wearable by a user to which is mounted at least sensing circuitry and display circuitry. The sensing circuitry may sense at least visible data and depth data. Control circuitry may then cause the display circuitry to visibly present the depth to the user based on the visible data and depth data. For example, the display circuitry may present visible indicia indicating depth to appear superimposed on the field of view to indicate different depths in the field of view, or may alter the appearance of objects in the field of view based on the depth of each object. The system may also be capable of sensing a particular trigger event, and in response may initiate sensing and presentation for a peripheral field of view of the user.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system to compensate for visual impairment, as provided below.

According to example 1 there is provided a system to compensate for visual impairment. The system may comprise a frame wearable by a user, sensing circuitry mounted to the frame, wherein the sensing circuitry is to at least sense visible data and depth data in a field of view of the user, display circuitry mounted to the frame and control circuitry to cause the display circuitry to present a visible representation of depth in the field of view based on the visible data and the depth data.

Example 2 may include the elements of example 1, wherein the sensing circuitry comprises at least one camera to sense the visible data and at least one infrared emitter and detector pair to sense the depth data.

Example 3 may include the elements of example 2, wherein the depth of objects sensed in the field of view is determined utilizing a time-of-flight calculation based on detected reflection of emitted IR signals.

Example 4 may include the elements of any of examples 1 to 3, wherein the display circuitry comprises at least one transparent or semi-transparent lens mounted in the frame, the visible representation of depth in the field of view being presented on the at least one lens to visibly convey depth to the user.

Example 5 may include the elements of any of examples 1 to 4, wherein the visible representation of depth comprises visible indicia of depth presented by the display circuitry so as to appear superimposed on the field of view.

Example 6 may include the elements of any of examples 1 to 5, wherein the visible representation of depth comprises modifications to the appearance of objects in the field of view to visibly represent depth.

Example 7 may include the elements of example 6, wherein the modifications to the appearance comprise changing the color hue of the objects.

Example 8 may include the elements of any of examples 1 to 7, wherein in presenting a visible representation of depth the control circuitry is to cause the display circuitry to present the visible data modified to include the visible representation of depth superimposed on the visible data.

Example 9 may include the elements of any of examples 1 to 8, wherein the control circuitry is to cause the display circuitry to present the visible representation of depth only for depths greater than a certain distance from the user.

Example 10 may include the elements of any of examples 1 to 9, further comprising user interface circuitry to at least sense a trigger event based on at least one of a position, orientation, velocity or acceleration.

Example 11 may include the elements of example 10, wherein the control circuitry is to cause the sensing circuitry to initiate sensing for a peripheral field of view based on sensing the trigger event.

Example 12 may include the elements of example 11, wherein in initiating sensing for a peripheral field of view the sensing circuitry is to move a sensor to view the peripheral field of view.

Example 13 may include the elements of any of examples 11 to 12, wherein in initiating sensing for a peripheral field of view the sensing circuitry is to activate a sensor to view the peripheral field of view.

Example 14 may include the elements of any of examples 10 to 13, wherein the control circuitry is to cause the display circuitry to present a peripheral field of view to the user based on sensing the trigger event.

Example 15 may include the elements of example 14, wherein in presenting the peripheral field of view the display circuitry is to superimpose a virtual screen displaying the peripheral field of view over a portion of a lens in the display circuitry.

Example 16 may include the elements of any of examples 1 to 15, further comprising user interface circuitry to at least sense a trigger event based on at least one of a position, orientation, velocity or acceleration, wherein the control circuitry is to cause the display circuitry to present a peripheral field of view to the user based on sensing the trigger event.

Example 17 may include the elements of any of examples 1 to 16, wherein the control circuitry is mounted to the frame.

Example 18 may include the elements of any of examples 1 to 17, wherein the frame is an eyeglass frame.

According to example 19 there is provided a method for providing compensation for visual impairment. The method may comprise capturing visual data within a field of view of a user utilizing sensing circuitry mounted to a frame wearable by the user, capturing depth data utilizing the sensing circuitry and presenting a visible representation of depth in the field of view based on the visible data and the depth data utilizing display circuitry mounted to the frame.

Example 20 may include the elements of example 19, wherein the visible representation of depth comprises visible indicia of depth presented by the display circuitry so as to appear superimposed on the field of view.

Example 21 may include the elements of any of examples 19 to 20, wherein the visible representation of depth comprises modifications to the appearance of objects in the field of view to visibly represent depth.

Example 22 may include the elements of example 21, wherein the modifications to the appearance comprise changing the color hue of the objects.

Example 23 may include the elements of any of examples 19 to 22, wherein presenting a visible representation of depth comprises causing the display circuitry to present the visible data modified to include the visible representation of depth superimposed on the visible data.

Example 24 may include the elements of any of examples 19 to 23, and may further comprise causing the display circuitry to present the visible representation of depth only for depths greater than a certain distance from the user.

Example 25 may include the elements of any of examples 19 to 24, and may further comprise causing the sensing circuitry to initiate sensing for a peripheral field of view based on sensing a trigger event.

Example 26 may include the elements of example 25, and may further comprise sensing the trigger event based on at least one of a position, orientation, velocity or acceleration.

Example 27 may include the elements of any of examples 25 to 26, wherein initiating sensing for a peripheral field of view comprises moving a sensor to view the peripheral field of view.

Example 28 may include the elements of any of examples 25 to 27, wherein initiating sensing for a peripheral field of view comprises activating a sensor to view the peripheral field of view.

Example 29 may include the elements of any of examples 19 to 28, and may further comprise causing the display circuitry to present a peripheral field of view to the user based on sensing a trigger event.

Example 30 may include the elements of example 29, wherein presenting the peripheral field of view comprises superimposing a virtual screen displaying the peripheral field of view over a portion of a lens in the display circuitry.

Example 31 may include the elements of any of examples 19 to 30, and may further comprise causing the sensing circuitry to initiate sensing for a peripheral field of view based on sensing a trigger event and causing the display circuitry to present a peripheral field of view to the user based on sensing a trigger event.

Example 32 may include the elements of any of examples 19 to 31, wherein the frame is an eyeglass frame.

According to example 33 there is provided a system for providing compensation for visual impairment including at least one device, the system being arranged to perform the method of any of the above examples 19 to 32.

According to example 34 there is provided a chipset arranged to perform the method of any of the above examples 19 to 32.

According to example 35 there is provided at least one machine readable medium comprising a plurality of instructions that, in response to be being executed on a computing device, cause the computing device to carry out the method according to any of the above examples 19 to 32.

According to example 36 there is provided at least one device configured for providing compensation for visual impairment, the at least one device being arranged to perform the method of any of the above examples 19 to 32.

According to example 37 there is provided a system for providing compensation for visual impairment. The system may comprise means for sensing visual data within a field of view of a user utilizing sensing circuitry mounted to a frame wearable by the user, means for sensing depth data utilizing the sensing circuitry and means for presenting a visible representation of depth in the field of view based on the visible data and the depth data utilizing display circuitry mounted to the frame.

Example 38 may include the elements of example 37, wherein the visible representation of depth comprises visible indicia of depth presented by the display circuitry so as to appear superimposed on the field of view.

Example 39 may include the elements of any of examples 37 to 38, wherein the visible representation of depth comprises modifications to the appearance of objects in the field of view to visibly represent depth.

Example 40 may include the elements of example 39, wherein the modifications to the appearance comprise changing the color hue of the objects.

Example 41 may include the elements of any of examples 37 to 40, wherein the means for presenting a visible representation of depth comprise means for causing the display circuitry to present the visible data modified to include the visible representation of depth superimposed on the visible data.

Example 42 may include the elements of any of examples 37 to 41, and may further comprise means for causing the display circuitry to present the visible representation of depth only for depths greater than a certain distance from the user.

Example 43 may include the elements of any of examples 37 to 42, and may further comprise means for causing the sensing circuitry to initiate sensing for a peripheral field of view based on sensing a trigger event.

Example 44 may include the elements of example 43, and may further comprise means for sensing the trigger event based on at least one of a position, orientation, velocity or acceleration.

Example 45 may include the elements of any of examples 43 to 44, wherein the means for initiating sensing for a peripheral field of view comprise means for moving a sensor to view the peripheral field of view.

Example 46 may include the elements of any of examples 43 to 45, wherein the means for initiating sensing for a peripheral field of view comprise means for activating a sensor to view the peripheral field of view.

Example 47 may include the elements of any of examples 37 to 46, and may further comprise means for causing the display circuitry to present a peripheral field of view to the user based on sensing a trigger event.

Example 48 may include the elements of example 47, wherein the means for presenting the peripheral field of view comprise means for superimposing a virtual screen displaying the peripheral field of view over a portion of a lens in the display circuitry.

Example 49 may include the elements of any of examples 37 to 48, and may further comprise means for causing the sensing circuitry to initiate sensing for a peripheral field of view based on sensing a trigger event and means for causing the display circuitry to present a peripheral field of view to the user based on sensing a trigger event.

Example 50 may include the elements of any of examples 37 to 49, wherein the frame is an eyeglass frame.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system to compensate for visual impairment, comprising:
   a frame wearable by a user;
   sensing circuitry mounted to the frame, wherein the sensing circuitry is to at least sense visible data and depth data in a field of view of the user;
   display circuitry mounted to the frame;
   control circuitry to cause the display circuitry to present a visible representation of depth in the field of view based on the visible data and the depth data;
   wherein:
   the visible representation of depth comprises at least a change in a color hue of the object from a default color hue of the object to an altered color hue; and
   the altered color hue is correlated by the control circuitry to a distance of the object from the user.

2. The system of claim 1, wherein the sensing circuitry comprises at least one camera to sense the visible data and at least one infrared emitter and detector pair to sense the depth data.

3. The system of claim 2, wherein the depth of object sensed in the field of view is determined utilizing a time-of-flight calculation based on detected reflection of emitted IR signals.

4. The system of claim 1, wherein the display circuitry comprises at least one transparent or semi-transparent lens mounted in the frame, the visible representation of depth in the field of view being presented on the at least one lens to visibly convey depth to the user.

5. The system of claim 1, wherein the visible representation of depth further comprises visible indicia of depth presented by the display circuitry so as to appear superimposed on the field of view.

6. The system of claim 1, wherein the control circuitry is to cause the sensing circuitry to initiate sensing for a peripheral field of view based on a sensed trigger event.

7. The system of claim 6, further comprising user interface circuitry to at least sense said trigger event based on at least one of a position, orientation, velocity, or acceleration.

8. The system of claim 7, wherein the control circuitry is to cause the display circuitry to present a peripheral field of view to the user based on sensing the trigger event.

9. The system of claim 1, wherein in presenting a visible representation of depth the control circuitry is to cause the display circuitry to present the visible data modified to include the visible representation of depth superimposed on the visible data.

10. The system of claim 1, wherein the control circuitry is to cause the display circuitry to present the visible representation of depth only for depths greater than a certain distance from the user.

11. A method for providing compensation for visual impairment, comprising:
capturing visual data within a field of view of a user utilizing sensing circuitry mounted to a frame wearable by the user;
capturing depth data utilizing the sensing circuitry;
presenting a visible representation of depth in the field of view based on the visible data and the depth data utilizing display circuitry mounted to the frame, the visible representation of depth comprising at least a change in a color hue of the object from a default color hue of the object to an altered color hue; and
wherein the altered color hue is correlated by the control circuitry to a distance of the object from the user.

12. The method of claim 11, wherein the visible representation of depth further comprises visible indicia of depth presented by the display circuitry so as to appear superimposed on the field of view.

13. The method of claim 11, further comprising causing the sensing circuitry to initiate sensing for a peripheral field of view based on sensing a trigger event wherein the visible representation of depth comprises modifications to the appearance of objects in the field of view to visibly represent depth.

14. The method of claim 13, further comprising:
sensing the trigger event based on at least one of a position, orientation, velocity or acceleration.

15. The method of claim 13, further comprising: causing the display circuitry to present a peripheral field of view to the user based on sensing the trigger event.

16. The method of claim 11, wherein presenting a visible representation of depth further comprises causing the display circuitry to present the visible data modified to include the visible representation of depth superimposed on the visible data.

17. The method of claim 11, further comprising:
causing the display circuitry to present the visible representation of depth only for depths greater than a certain distance from the user.

18. At least one non-transitory machine-readable storage medium having stored thereon, individually or in combination, instructions for providing compensation for visual impairment that, when executed by one or more processors, cause the one or more processors to:
sense visual data within a field of view of a user utilizing sensing circuitry mounted to a frame wearable by the user;
sense depth data utilizing the sensing circuitry;
present a visible representation of depth in the field of view based on the visible data and the depth data utilizing display circuitry mounted to the frame, the visible representation of depth comprising at least a change in a color hue of the object from a default color hue of the object to an altered color hue;
wherein the altered color hue is correlated by the control circuitry to a distance of the object from the user.

19. The non-transitory storage medium of claim 18, wherein the visible representation of depth further comprises visible indicia of depth presented by the display circuitry so as to appear superimposed on the field of view.

20. The non-transitory storage medium of claim 18, wherein said instructions when executed further cause the sensing circuitry to initiate sensing for a peripheral field of view based on sensing a trigger event.

21. The non-transitory storage medium of claim 20, further comprising instructions that, when executed by one or more processors, cause the one or more processors to:
sense the trigger event based on at least one of a position, orientation, velocity or acceleration.

22. The non-transitory storage medium of claim 20, further comprising instructions that, when executed by one or more processors, cause the one or more processors to:
cause the display circuitry to present a peripheral field of view to the user based on sensing a trigger event.

23. The non-transitory storage medium of claim 18, wherein the instructions to present a visible representation of depth comprise instructions to cause the display circuitry to present the visible data modified to include the visible representation of depth superimposed on the visible data.

24. The non-transitory storage medium of claim 18, further comprising instructions that, when executed by one or more processors, cause the one or more processors to:
causing the display circuitry to present the visible representation of depth only for depths greater than a certain distance from the user.

* * * * *